(12) United States Patent
Marchetti et al.

(10) Patent No.: US 12,413,270 B2
(45) Date of Patent: Sep. 9, 2025

(54) GEOMETRIC DEEP LEARNING FOR LATTICE REDUCTION

(71) Applicant: QUALCOMM Incorporated, San Diego, CA (US)

(72) Inventors: Giovanni Luca Marchetti, Amsterdam (NL); Gabriele Cesa, Diemen (NL); Kumar Pratik, Amsterdam (NL); Arash Behboodi, Amsterdam (NL)

(73) Assignee: QUALCOMM Incorporated, San Diego, CA (US)

( * ) Notice: Subject to any disclaimer, the term of this patent is extended or adjusted under 35 U.S.C. 154(b) by 66 days.

(21) Appl. No.: 18/410,660

(22) Filed: Jan. 11, 2024

(65) Prior Publication Data

US 2025/0233623 A1 Jul. 17, 2025

(51) Int. Cl.
*H04B 7/0413* (2017.01)
*H04B 7/08* (2006.01)

(52) U.S. Cl.
CPC ............. *H04B 7/0413* (2013.01); *H04B 7/08* (2013.01)

(58) Field of Classification Search
CPC ................................. H04B 7/0413; H04B 7/08
See application file for complete search history.

(56) References Cited

U.S. PATENT DOCUMENTS

| | | | |
|---|---|---|---|
| 11,309,992 B2 * | 4/2022 | Landis ................... | H04B 7/086 |
| 2014/0185716 A1 * | 7/2014 | Aubert ............... | H04L 25/03242 |
| | | | 375/341 |
| 2018/0287675 A1 * | 10/2018 | Sheikh ................. | H04B 7/0456 |
| 2020/0259544 A1 * | 8/2020 | Demmer ............. | H04L 25/0204 |
| 2022/0294498 A1 * | 9/2022 | Shibata ................ | H04B 7/0426 |

OTHER PUBLICATIONS

Yao, Huan et al., "Lattice-reduction-aided detectors for MIMO communication systems," Global Telecommunications Conference, 2002. Globecom '02. IEEE, Taipei, Taiwan, 2002, pp. 424-428 vol.1 (Year: 2002).*
Qi, Xiao-Feng et al., "A Lattice-Reduction-Aided Soft Demapper for High-Rate Coded MIMO-OFDM Systems," IEEE Signal Processing Letters, vol. 14, No. 5, pp. 305-308, May 2007 (Year: 2007).*

(Continued)

*Primary Examiner* — David B Lugo
(74) *Attorney, Agent, or Firm* — Dinsmore & Shohl LLP

(57) ABSTRACT

Certain aspects of the present disclosure provide techniques for wireless communications by an apparatus. Certain techniques include receiving signals corresponding to a MIMO channel matrix; generating a first gram matrix from a basis for a first lattice corresponding to a first signal of the received signals; providing the first gram matrix to a neural lattice reduction model comprising an equivariant neural network configured to generate a current extended Gauss move; generating, with the neural lattice reduction model, a current partial changed basis based on the current extended Gauss move and the basis; executing one or more additional iterations of the neural lattice reduction model; and demapping the MIMO channel matrix based on combining the current partial changed basis and each of the additional partial changed basis generated by each of the one or more additional iterations of the neural lattice reduction model.

20 Claims, 11 Drawing Sheets

(56) References Cited

OTHER PUBLICATIONS

Notice of Transmittal of the International Search Report and the Written Opinion of the International Searching Authority mailed on Mar. 18, 2025 relating to International Application No. PCT/US2024/059867 (13 pages).

Yi-Mei Li, et. al., "Deep-Learning-Based Lattice Reduction Pre-processing for Time-Correlated MIMO Systems", 2023 Asia Pacific Signal and Information Processing Association Annual Summit and Conference (APSIPA ASC), IEEE (8 pages).

Ali J. Almasadeh, et. al., "Enhanced Deep Learning for Massive MIMO Detection Using Approximate Matrix Inversion", 2022 Fifth International Conference on Communications, Signal Processing and their Applications (IC SPA), IEEE (6 pages).

Vincent Corlay, et. al., "Neural Network Approaches to Point Lattice Decoding", submitted to IEEE Transactions on Information Theory, arXiv:2012.07032v2 pp. 1-40 (40 pages).

Notice of Transmittal of the International Search Report and the Written Opinion of the International Searching Authority mailed on Mar. 10, 2025 relating to International Application No. PCT/US2024/059864 (14 pages).

Kapfunde G., et al., "Low-Complexity Lattice Reduction Aided Schnorr Euchner Sphere Decoder Detection Schemes with MMSE and SIC Pre-processing for MIMO Wireless Communication Systems", IEEE, 2021, pp. 216-223.

Lim D., et al., "Expressive Sign Equivariant Networks for Spectral Geometric Learning", arXiv:2312.02339v1 [cs.LG] Dec. 4, 2023, 37th Conference on Neural Information Processing Systems, 2023, 30 Pages.

Seysen M., "Simultaneous Reduction of a Lattice Basis and Its Reciprocal Basis", Combinatorica, vol. 13, No. 3, Sep. 1993, pp. 363-376.

Worrall D.E., et al., "Learning Perturbations for Soft-Output Linear MIMO Demappers", arXiv:2209.00529v1 [cs.IT] Sep. 1, 2022, 6 Pages.

* cited by examiner

GEOMETRIC DEEP LEARNING FOR LATTICE REDUCTION

INTRODUCTION

Field of the Disclosure

Aspects of the present disclosure relate to wireless communications, and more particularly, to techniques for lattice reduction with neural lattice reduction.

DESCRIPTION OF RELATED ART

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

Lattice reduction is useful to solve the Closest Vector Problem (CVP) and Shortest Vector Problem (SVP) on lattices, which, as an example, arise respectively in multiple-input multiple-output (MIMO) demapping processes and standard public-key methods for post-quantum cryptography processes. CVP and SVP solutions are possible when the bases (B) are orthogonal or nearly-orthogonal. However, not all lattices admit orthogonal bases, thus making the problem of finding the most orthogonal basis of a lattice, that is, the lattice reduction problem, NP-hard and therefore unfeasible to solve directly. As a result, challenges arise in the calculation of lattice reduction. For example, there is a challenge in harnessing the full potential of MIMO systems with respect to the development of power and computationally efficient MIMO detectors which separate spatially multiplexed data streams. Furthermore, a drawback of MIMO is the increased complexity of the detector due to the non-orthogonality of MIMO channels. The computational complexity increases exponentially with the number of antennas.

Accordingly, certain aspects herein provide techniques for reducing multiple lattices, for example, corresponding to a MIMO channel matrix, in a computationally efficient process. Specifically, certain methods described herein provide a neural lattice reduction process that implements a recursion process that iteratively reduces a lattice, which in the MIMO use case provides a computationally efficient MIMO demapping process so that the full potential of MIMO-OFDM (orthogonal frequency division multiplexing) can be harnessed. That is, in certain aspects, the neural lattice reduction process has shown to have less runtime compared to implementations of Lenstra-Lenstra-Lovisz (LLL) algorithms. Such techniques may similarly provide reduced computational complexity lattice reduction for other use cases, such as post-quantum cryptography.

One aspect provides a method for wireless communications by an apparatus. The method includes receiving signals corresponding to a multiple-input multiple-output (MIMO) channel matrix; generating a first gram matrix from a basis for a first lattice corresponding to a first signal of the received signals; providing the first gram matrix to a neural lattice reduction model comprising an equivariant neural network configured to generate a current extended Gauss move; generating, with the neural lattice reduction model, a current partial changed basis based on the current extended Gauss move and the basis; executing one or more additional iterations of the neural lattice reduction model, wherein each iteration comprises: generating a subsequent gram matrix from the current partial changed basis, providing the subsequent gram matrix to the equivariant neural network to generate a subsequent extended Gauss move, and generating an additional partial changed basis based on the subsequent extended Gauss move and the current partial changed basis; and demapping the MIMO channel matrix based on combining the current partial changed basis and each of the additional partial changed basis generated by each of the one or more additional iterations of the neural lattice reduction model.

Other aspects provide: one or more apparatuses operable, configured, or otherwise adapted to perform any portion of any method described herein (e.g., such that performance may be by only one apparatus or in a distributed fashion across multiple apparatuses); one or more non-transitory, computer-readable media comprising instructions that, when executed by one or more processors of one or more apparatuses, cause the one or more apparatuses to perform any portion of any method described herein (e.g., such that instructions may be included in only one computer-readable medium or in a distributed fashion across multiple computer-readable media, such that instructions may be executed by only one processor or by multiple processors in a distributed fashion, such that each apparatus of the one or more apparatuses may include one processor or multiple processors, and/or such that performance may be by only one apparatus or in a distributed fashion across multiple apparatuses); one or more computer program products embodied on one or more computer-readable storage media comprising code for performing any portion of any method described herein (e.g., such that code may be stored in only one computer-readable medium or across computer-readable media in a distributed fashion); and/or one or more apparatuses comprising one or more means for performing any portion of any method described herein (e.g., such that performance would be by only one apparatus or by multiple apparatuses in a distributed fashion). By way of example, an apparatus may comprise a processing system, a device with a processing system, or processing systems cooperating over one or more networks. An apparatus may comprise one or more memories; and one or more processors configured to cause the apparatus to perform any portion of any method described herein. In some examples, one or more of the processors may be preconfigured to perform various functions or operations described herein without requiring configuration by software.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
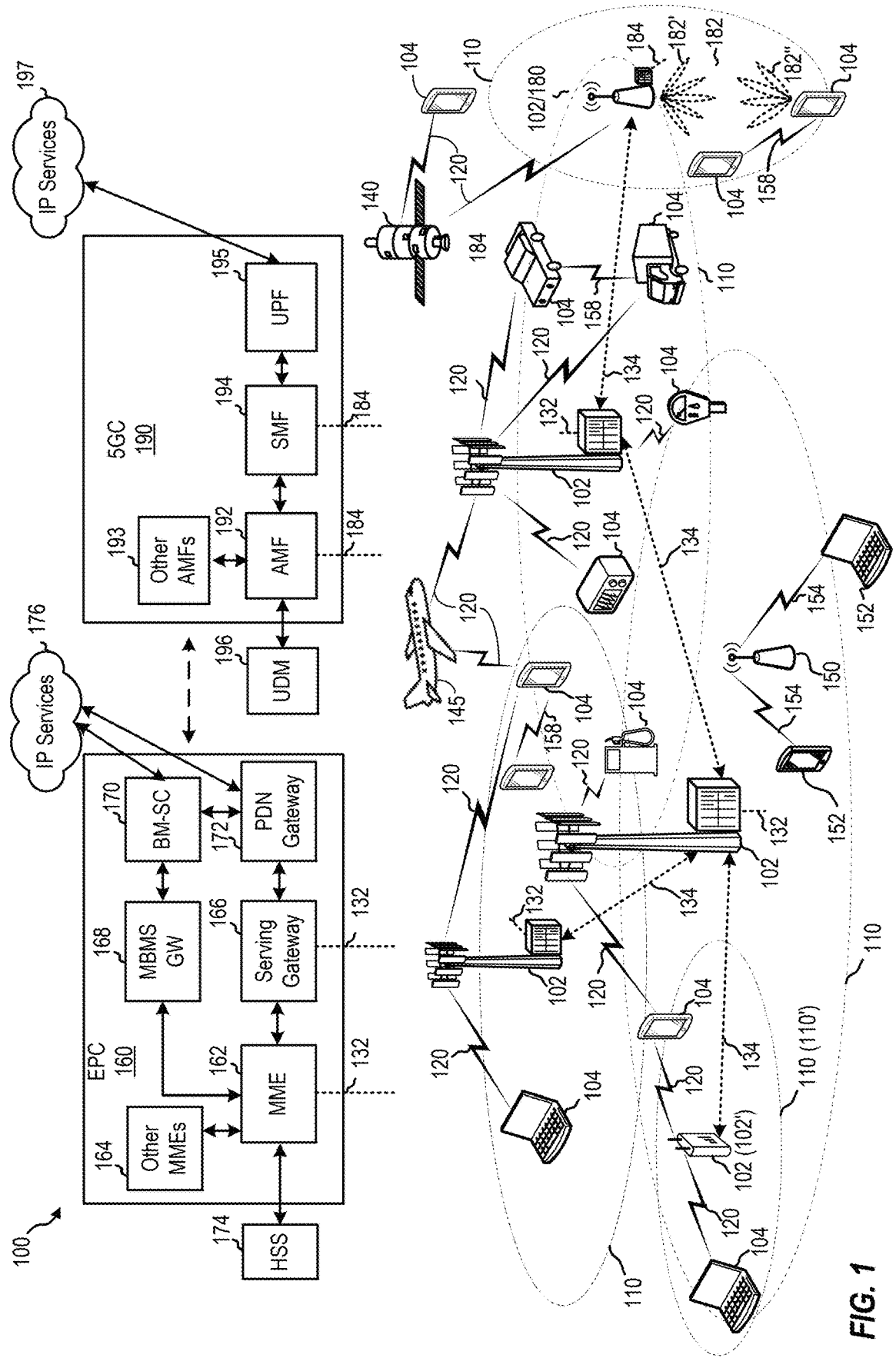
FIG. 1 depicts an example wireless communications network.

Aspects of the present disclosure provide apparatuses, methods, processing systems, and computer-readable mediums for lattice reduction with neural lattice reduction.

As discussed, the problem of lattice reduction is NP-hard and therefore unfeasible to solve directly. As a result, a technical problem arises in the calculation of lattice reduction. For example, there is a challenge in harnessing the full potential of MIMO systems with respect to the development of power and computationally efficient MIMO detectors which separate spatially multiplexed data streams. Furthermore, a drawback of MIMO is the increased complexity of the detector due to the non-orthogonality of MIMO channels. The computational complexity increases exponentially with the number of antennas.

Accordingly, certain aspects herein provide a technical solution to the technical problem, by providing techniques for reducing multiple lattices, for example, corresponding to a MIMO channel matrix, in a computationally efficient process. In certain aspects, the methods described herein provide a neural lattice reduction process that implements a recursion process that iteratively reduces a lattice, which in the MIMO use case provides a computationally efficient MIMO demapping process so that the full potential of MIMO-OFDM (orthogonal frequency division multiplexing) may be harnessed. That is, in certain aspects, the neural lattice reduction process has shown to have less runtime compared to implementations of Lenstra-Lenstra-Lovisz (LLL) algorithms.

Linear MIMO detectors use zero-forcing (ZF) or minimum-mean squared error (MMSE) techniques to demap a received signal into a point in a signal constellation. These linear MIMO detectors, however, do not account for interstream interference in which one stream causes interference to other streams, and thus, are generally not able to demap received signals in situations in which the signals carried on different carriers are highly correlated. In other words, the low complexity linear MIMO detectors, such as Zero-Forcing (ZF) or Minimum-Mean Square Error (MMSE) fail to account for inter-stream interference and suffers from performance degradation especially for correlated MIMO channels, and hence, are not considered viable solutions.

Certain aspects of the present disclosure improve on existing linear MIMO detectors with minimal adaptation and provide a lightweight alternative (near-maximum-likelihood (ML) performance) to the full ML solution (Tree-based sequential search based demappers like ML, and Sphere Decoding).

Traditional lattice reduction (LR) algorithms, such as LLL, are based on simplified matrix assumptions like uniform distribution of lattice coefficients, but certain aspects of techniques discussed herein may leverage the structure in real world observed channel, and may be fine-tuned, resulting in better performance than LLL.

Furthermore, conventional LR heuristics cannot be trivially batched to run in parallel and hence, are not able to fully exploit neural accelerator chips (e.g., a Neural Processing SDK (NSP). In certain aspects, a neural LR method can fully leverage the deep learning hardware and can parallelize LR across multiple lattices (distributed across frequency and time). A technical effect of certain aspects of neural lattice reduction processes and apparatuses described herein may be the capability to provide significantly less runtime compared to other implementations of LLL.

Introduction to Wireless Communications Networks

The techniques and methods described herein may be used for various wireless communications networks. While aspects may be described herein using terminology commonly associated with 3G, 4G, 5G, 6G, and/or other generations of wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). As such communications devices are part of wireless communications network 100, and facilitate wireless communications, such communications devices may be referred to as wireless communications devices. For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and transporter 145, which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
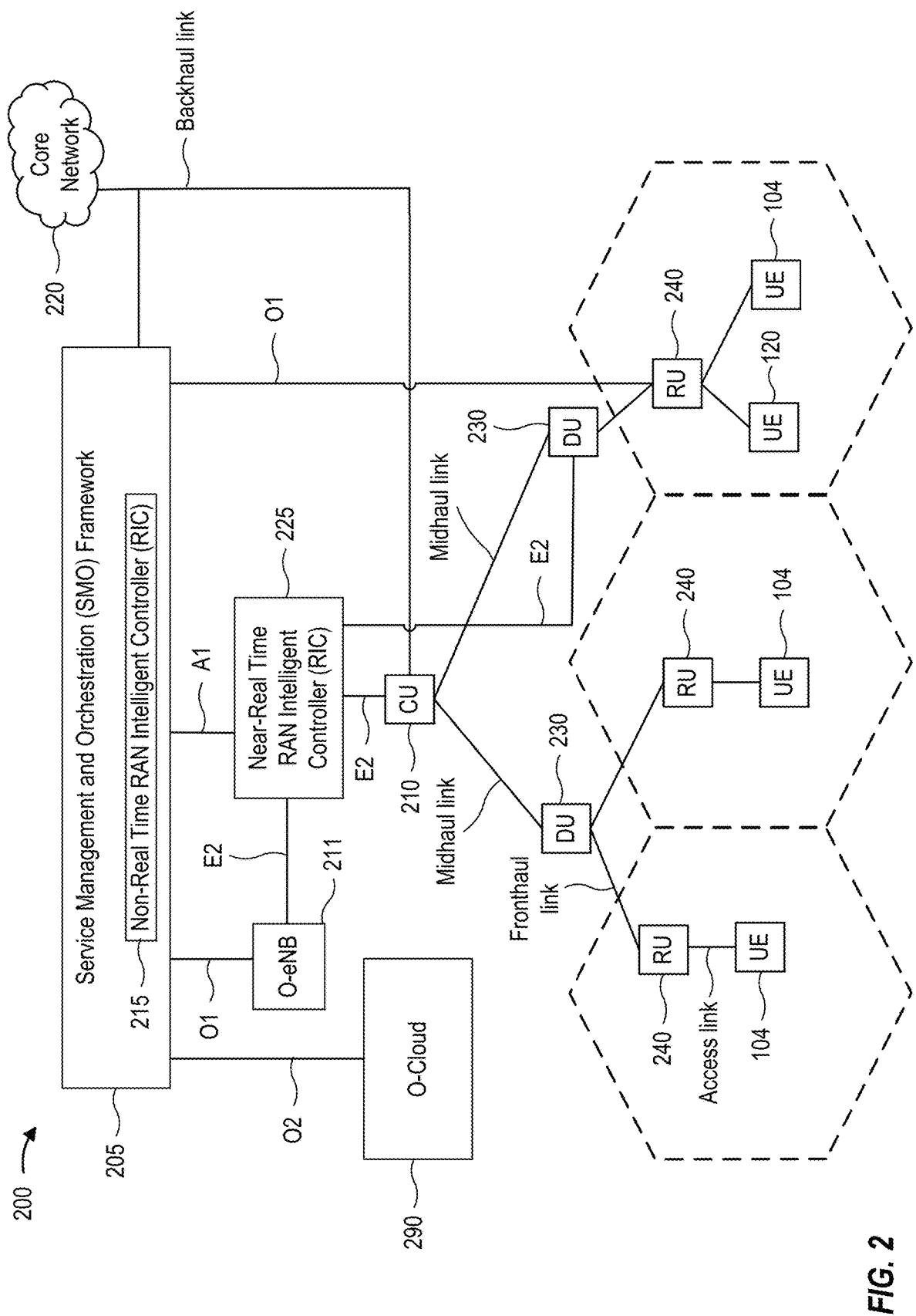
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5GNR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
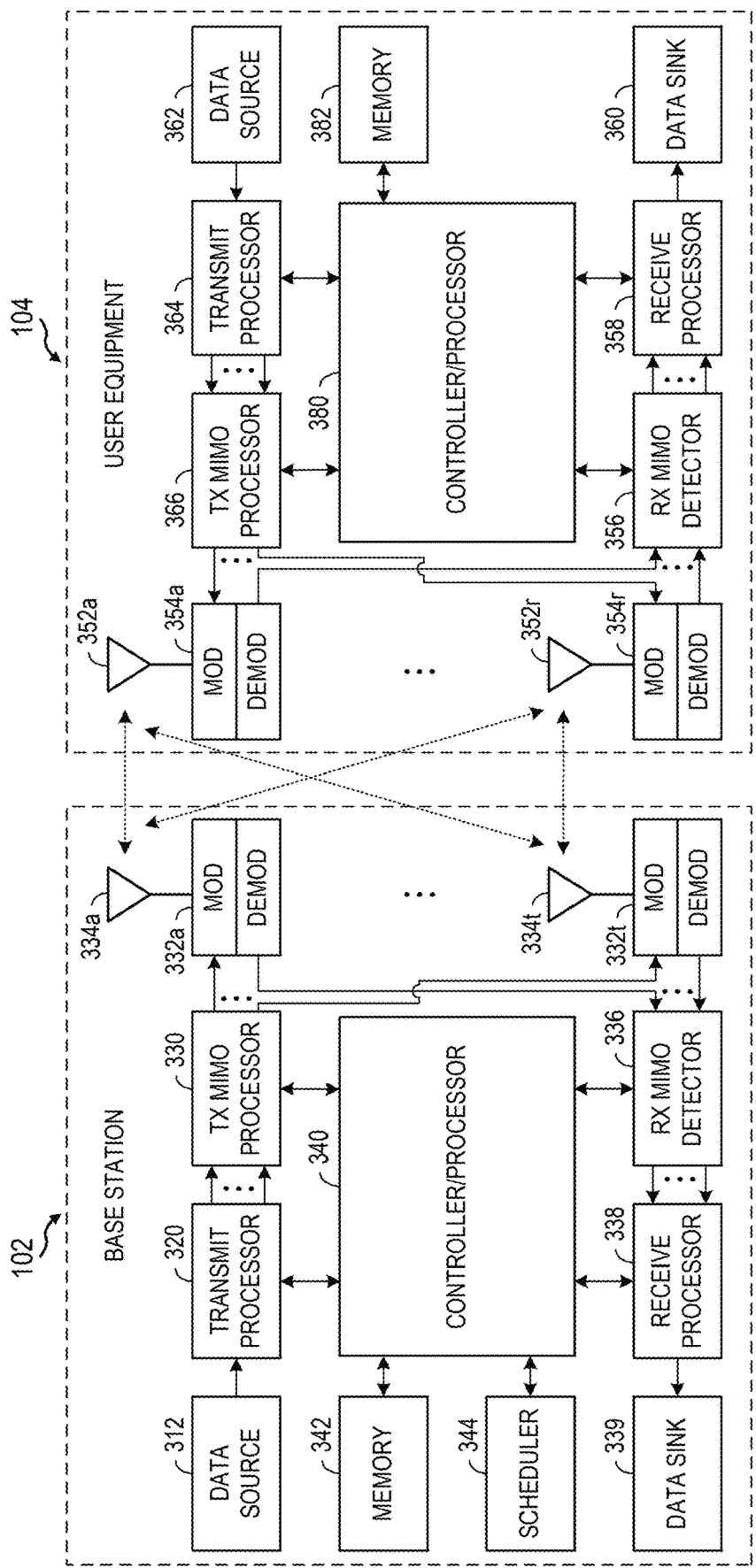
FIG. 3 depicts aspects of an example base station and an example user equipment (UE).

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

RX MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a RX MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RXMIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
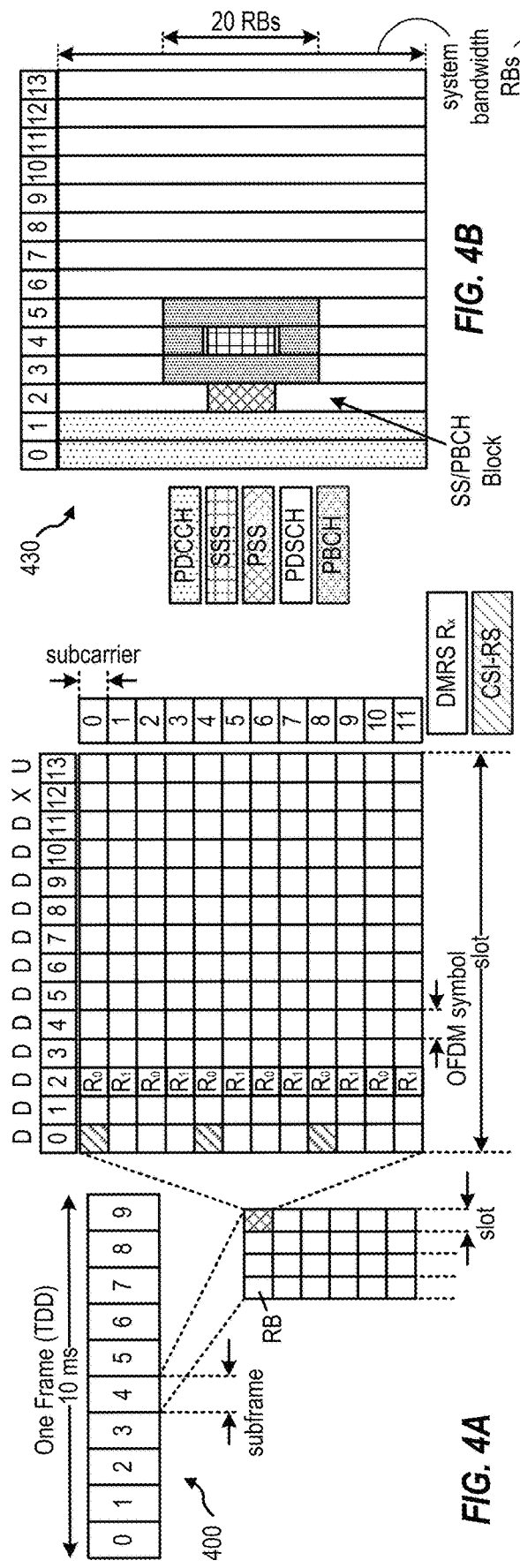
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and 2μ slots/subframe. The sub-carrier spacing and symbol length/duration are a function of the numerology. The subcarrier spacing may be equal to 2×15 kHz, where is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

MIMO Demapping with Lattice Reduction (LR)

Figure 5:
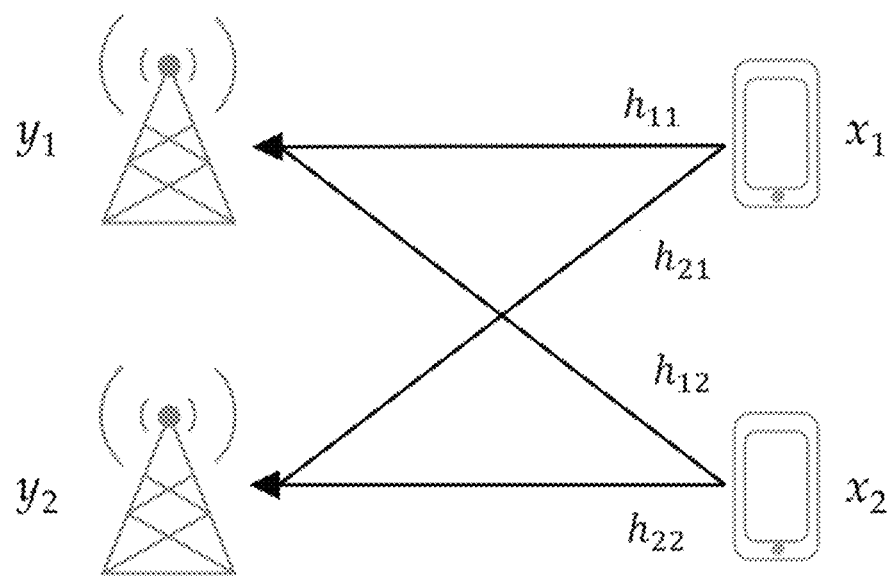
FIG. 5 is a diagram illustrating an example of a MIMO model.

FIG. 5 is a diagram illustrating an example of a MIMO model 500. Lattices are grids in arbitrary dimensions. More formally, an n-dimensional lattice is a discrete subgroup of $\mathbb{R}^n$ of maximal rank.

If $\wedge \simeq \subseteq \mathbb{R}^n$ is a lattice ($\wedge$) in receiver space ($\mathbb{R}^n$) then there is an isomorphism of groups $\wedge \simeq \mathbb{Z}^n$. Such an isomorphism determines a basis of the lattice i.e., a set of linearly independent vectors $h_1, \ldots, h_n \in \mathbb{R}^n$ such that $\wedge = \mathbb{Z} h_1 \oplus \ldots \oplus \mathbb{Z} h_n$. A basis (H) is succinctly described by an invertible matrix $H \in GL_n(\mathbb{R})$ whose columns are the basis vectors. Any two bases H, $H' \in GL_n(\mathbb{R})$ are related via (right) multiplication by an integral invertible matrix i.e., H'=HQ for some $Q \in GL_n(\mathbb{Z}) = \{Q \in \mathbb{Z}^{n \times n} | \det(Q) = \pm 1\}$, wherein Q is a base-change matrix. Matrices belonging to $GL_n(\mathbb{Z})$ are deemed unimodular.

As noted above, lattices carry two fundamental computational problems. The SVP reduces to the CVP and the SVP is known to be NP-hard under randomized reductions.

Not all bases are created equal. The ideal bases are the orthogonal ones i.e., such that $H^T H$ is diagonal. However, not all lattices admit orthogonal bases, and the amount by which a basis is not orthogonal is measured by the orthogonality defect of $H \in GL_n(\mathbb{R})$ is $$\delta(H) = \frac{\prod_i |h_i|}{|\det(H)|} \geq 1$$

Given a basis of a lattice $H \in GL_n(\mathbb{R})$, a reduced basis H'=HQ, $Q \in GL_n(\mathbb{Z})$ can be found by minimizing the orthogonality defect $\delta(H')$. However, the above problem is NP-hard and therefore unfeasible to solve directly.

Certain aspects discussed herein provide a neural lattice reduction process using deep learning. For example, certain aspects relate to training a model of the form: $\varphi: GL_n(\mathbb{R}) \to GL_n(\mathbb{Z})$ on an objective of $L(H) = \log \delta(H\varphi(H))$. Lattice reduction exhibits two types of symmetries: left orthogonal invariance: $\varphi(RH) = \varphi(H)$ for all $R \in O_n(\mathbb{R})$ and right unimodular equivariance: $\varphi(HP) = P^{-1}\varphi(H)$ for all $P \in GL_n(\mathbb{Z})$. Certain aspects discussed herein solve the challenge of how to design p to satisfy both of the aforementioned properties with the neural lattice reduction model.

Multiple-input multiple-output (MIMO) wireless systems employ multiple antennas on both the transmit and receive sides, and provide increased spectral efficiency as compared to single-antenna systems.

In the context of MIMO signal processing, for example, as depicted in FIG. 5, a number of transmit antennas send signals $x_i$ to a number of receiver antennas. The signal, $x \in \mathbb{Z}^m$ transmission is modelled as a noisy linear process i.e.: y=Hx+ε, $H \in \mathbb{C}^{m \times m} = \mathbb{R}^{n \times n}$, n=2m; ε~N(0, σ²), and decoded as $\text{argmin}_{x \in \mathbb{Z}^m} |Hx - y|$. The set of possible transmitted (noiseless) signals defines a lattice in the receiver's space $\mathbb{R}^n$. MIMO decoding is an instance of Closest Vector Problem (CVP).

MIMO techniques may be used to achieve high data rates by transmitting signals from multiple antennas for reception by multiple antennas. MIMO wireless systems employ multiple antennas on both the transmit and receive sides, and provide increased spectral efficiency as compared to single-antenna systems. MIMO-OFDM enables high data rates (data-throughput) by transmitting multiple data streams in parallel in the same frequency band, referred to as spatial multiplexing.

At a receiver, various demappers may be used to decode the received signal and provide the received signal to error correction blocks for further processing. Because calculating probability estimates over transmitted bits to use as an input into error correction blocks is generally a computationally complex task, the neural lattice reduction processes as described herein adds minimal complexity over existing linear schemes while enhancing detection performance.

Aspects Related to Lattice Reduction Demodulation

Figure 6:
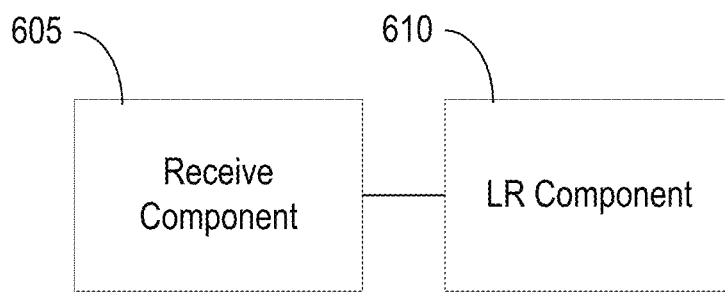
FIG. 6 is a diagram illustrating an example of a demodulator.

FIG. 6 is a diagram illustrating an example of a demodulator 600, in accordance with various aspects described herein. In some aspects, the demodulator 600 may be part of a wireless communications device, such as a UE 104, a base station (BS 102/180) and/or a component of a disaggregated base station of FIGS. 1-3. For example, the demodulator 600 may be part of a transceiver 354/332, RX MIMO detector 356/336, and/or receive processor 358/338. Demodulator 600 includes a receive component 605 and an LR component 610. One or more of components 605-610 of demodulator 600 may be part of transceiver 354/332, RX MIMO detector 356/336, and/or receive processor 358. Each of the components 605-610 of demodulator 600 may correspond to one or more hardware components specifically configured to carry out the stated processes/algorithm, implemented by one or more processors configured to perform the stated processes/algorithm, stored within a computer-readable medium for implementation by one or more processors, or some combination thereof.

Receive component 605 is configured to receive communications, such as from another wireless communications device (e.g., a UE 104, a base station (BS 102/180) and/or a component of a disaggregated base station of FIGS. 1-3). For example, a network entity may send a communication to a UE 104 in a communications channel (corresponding to a frequency range), or vice versa, which is received by receive component 605, such as using multiple antennas. The communication may be in the form of one or more beamformed transmissions on one or more REs scheduled for the wireless communications device. In some aspects, the communication in the form of one or more beamformed transmissions may correspond to one or more modulated signals. The receive component 605 outputs a vector j that is a representation of the received signaling, including the one or more beamformed transmissions, as received over each of the multiple antennas on the communications channel such as on the one or more REs scheduled for the wireless communications device. In certain aspects, LR component 610 is deploying geometric machine learning to approximate lattice reduction as described in more detail in FIG. 7.

Aspects Related to a Neural Lattice Reduction Method

Figure 7:
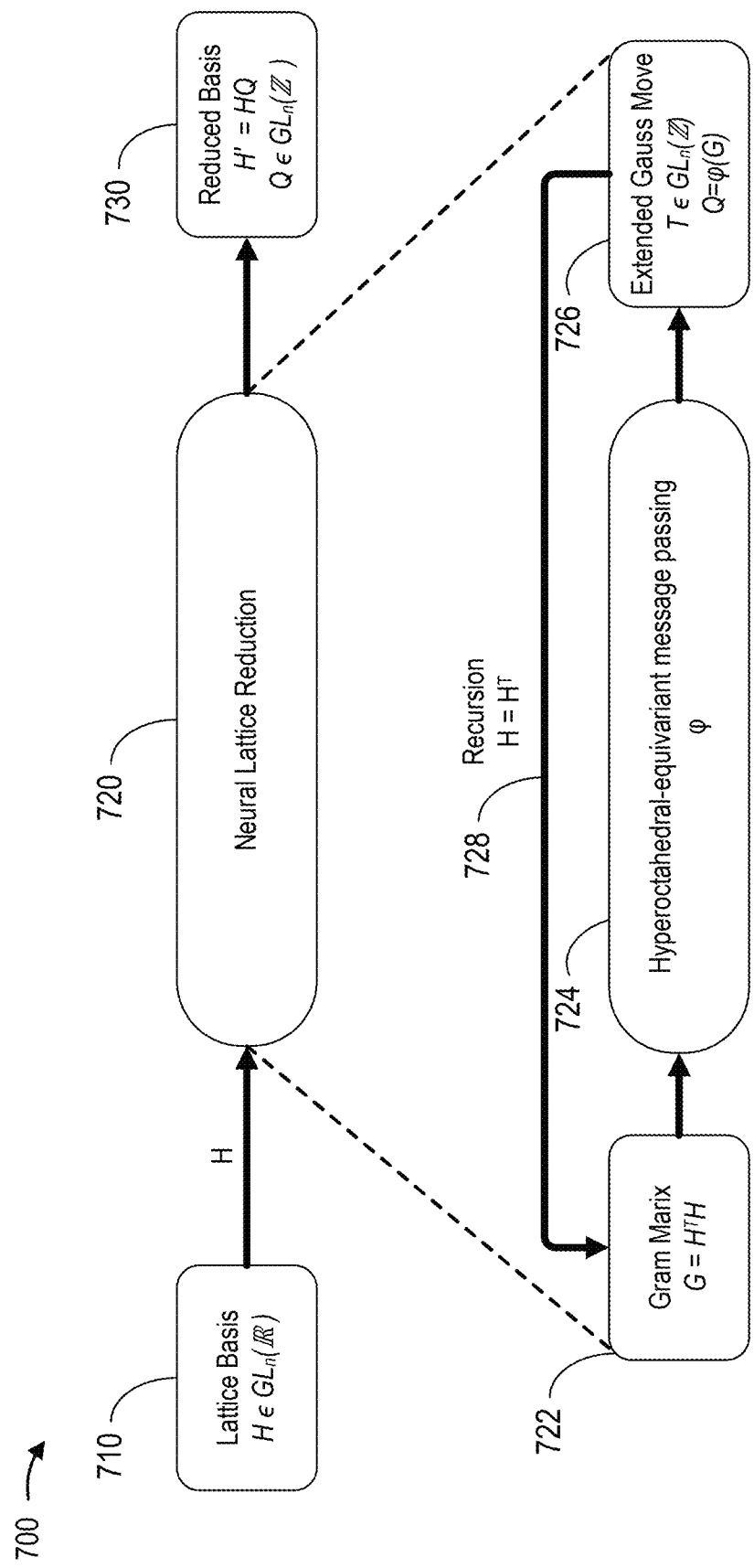
FIG. 7 schematically depicts an illustrative block diagram of a neural lattice reduction process.

FIG. 7 is a block diagram illustrating an example of lattice reduction component 700, such as the LR component 610 discussed with reference to FIG. 6, comprising a neural lattice reduction process. The neural lattice reduction process is described herein with reference to implementation in the MIMO demapping process. In some aspects, an apparatus, such as a UE 104 or network entity, receives signals corresponding to a MIMO channel matrix.

The input 710 of the model 720 is a basis $H \in GL_n(\mathbb{R})$, of a lattice A corresponding to a first signal of the received signals. The output 730 of the model 720 can be one of the following: a first output and/or a second output. The first output is a base-change matrix $Q \in GL_n(\mathbb{Z})$. In this case the approximated equivariant map is equivariant with respect to $GL_n(\mathbb{Z})$ and has discrete values. The second output is $H'=HQ$, $Q \in GL_n(\mathbb{Z})$. In this case the approximated map is invariant with respect to $GL_n(\mathbb{Z})$ and has continuous values. In either case, the natural candidate for the objective of the model is the orthogonality defect $\delta(H')$, which is differentiable with respect to H'. Since the orthogonality defect has a multiplicative form (e.g., it involves products, determinants, etc.), it may be convenient to consider the logarithmic objective: $L(H)=\log \delta(H\varphi(H))$.

The model 720 includes a gram matrix component 722, an equivariant neural network 724, an extended Gauss move component 726, and a recursion component 728.

The gram matrix component 722 generates a first gram matrix $(G=H^TH)$ from the basis (H) for a first lattice corresponding to a first signal of the received signals.

Orthogonal invariance may be achieved by taking the Gram matrix $G=H^TH$ as input. The latter transforms with respect to the right unimodular action as $HP \to P^TGP$. To simplify notation, the equivariant neural network 724 may be denoted by $\varphi$ that can take in input either H or $G=H^TH$. The first gram matrix may be provided to the equivariant neural network 724, $\varphi$. The equivariant neural network 724 may be configured to generate a current extended Gauss move.

Additionally, since equivariance to the whole $P \in GL_n(\mathbb{Z})$ is too difficult. The model 720 may consider only a significant subgroup, that is, the hyperoctahedral group given by the $2^n n!$ signed permutation matrices. This is the group of isometries of both the hyperoctahedron and the hypercube, and can be seen as a discrete analogue of the orthogonal group.

The model 720 may apply the equivariant neural network 724, $\varphi$, recursively in order to gradually reduce the lattice $Q=H\varphi(H\varphi(H\varphi(H))\ldots)$. The equivariance property $\varphi(P^TGP)=P^T\varphi(G)P$ may be compatible with this recursion.

At each iteration, $\varphi$ outputs a matrix in the following form, referred to as an extended Gauss move:

$$\begin{bmatrix} 1 & 0 & \ldots & m_{1,j} & \ldots & 0 \\ 0 & 1 & & \vdots & & \vdots \\ \vdots & & \ddots & \vdots & & \vdots \\ m_{i,1} & \ldots & 1 & \ldots & m_{i,j} & \ldots & m_{i,n} \\ \vdots & & \ddots & \vdots & & \vdots \\ 0 & & \ldots & m_{n,j} & \ldots & 1 \end{bmatrix}$$

The extended Gauss move has 1 on the diagonal and 0 everywhere except for a single row and a single column. Every $Q \in SL_n(\mathbb{Z})$ can be written as a product of $O(n)$ extended Gauss moves.

In order to obtain a matrix, referred to the extended Gauss move at the extended Gauss move component 726, the following steps may be performed. Given the matrix $M \in \mathbb{R}^{n \times n}$ produced by the equivariant neural network 724 (e.g., having a Graph Neural Network architecture), the index (i,j) is sampled via Gumbel-Softmax with a log-likelihood proportional to the absolute value of $|m_{ij}|$. Then, each value $m_{i,j}$ is discretized via stochastic rounding, for example, by rounding it up or down with a probability proportional to the rounding error. Next, while retaining the i-th row and the j-th column of M, the sampling is converted into an extended Gauss move by masking the diagonal and all the other entries. In some aspects, the retained values are discretized via stochastic rounding, which may be an unbiased and differentiable discretization technique.

Figure 8:
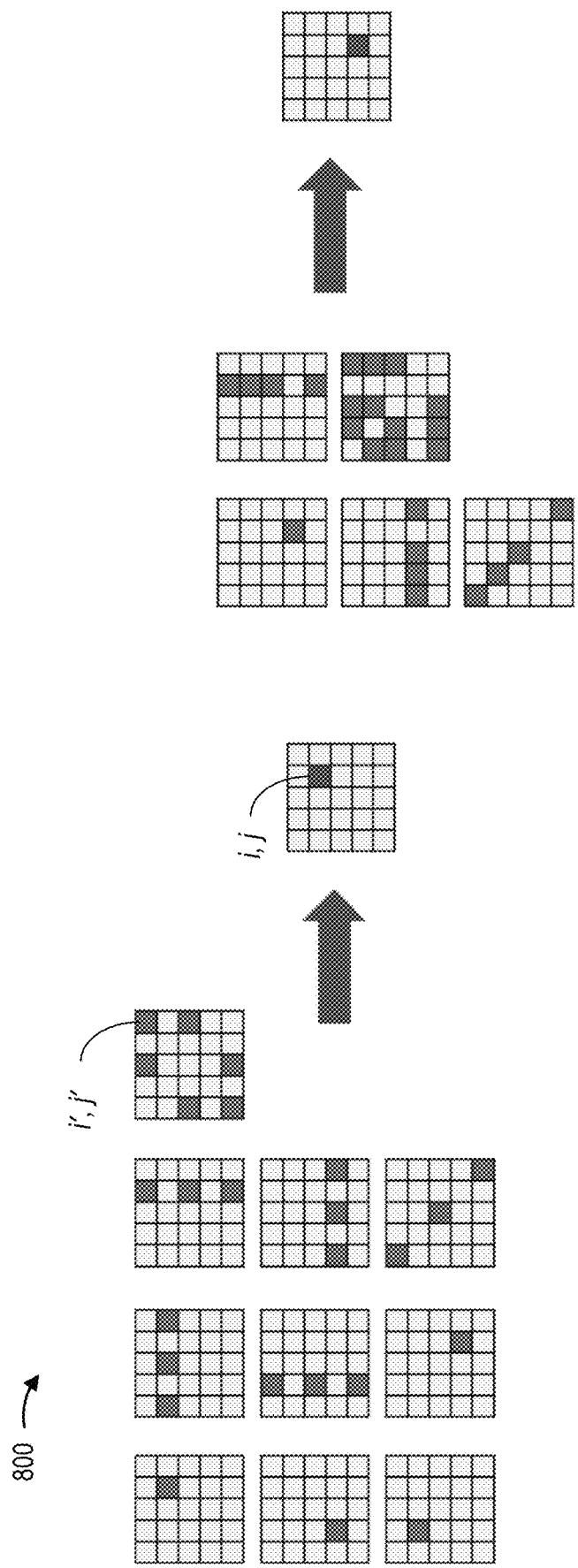
FIG. 8 depicts illustrative examples of equivariant message passing.

Furthermore, the model outputting M from G may have a message-passing Graph Neural Network architecture designed to satisfy $\varphi(P^TGP)=P^T \varphi(G)P$. For example, the graph considered has pairs of indices (i,j) as vertices and the following adjacency matrix $\Gamma_{i,\,j,\,i',\,j'}=(1_{\{a=b\}})_{a,b \in (i,\,j,\,i',\,j')}$, where $1_{\{a=b\}}$ denotes the Kronecker's delta function. In certain aspects, F can assume only 15 different values, for example as depicted in FIG. 8. Fifteen (15) possible messages from (i'j') to (i,j) are depicted.

Referring back to FIG. 7, in certain aspects, the equivariant neural network 724 propagates messages for l=1, ..., L iterations as: $G_{(i,j)}^{l+1}=\varphi^l(G_{(i,j)}^l \odot \Sigma_{(i',j')} \omega^l (G_{(i',j')}^l, \Gamma_{i,\,j,\,i',\,j'}))$. Here, $\varphi$, $\omega$ are Multi-Layer Perceptrons (MLPs).

The model 720 generates a current partial changed basis $(H'=H'_l)$ based on the current extended Gauss move (T) from the equivariant neural network 724 and the basis (H). In certain aspects, the model 720 is further configured to execute one or more additional iterations. In certain aspects, each iteration includes generating a subsequent gram matrix (G) from the current partial changed basis (H'), providing the subsequent gram matrix $(G=H^TH)$ to the equivariant neural network to generate a subsequent extended Gauss move ($T_{i+n}$), and generating an additional partial changed basis ($H'=H'_t$) based on the subsequent extended Gauss move ($T_{i+n}$) and the current partial changed basis ($H'$).

In certain aspects, a process of combining the current partial changed basis and each of the additional partial changed basis forms a first reduced basis for the first lattice with the reduced basis component (e.g., the output 730). In the MIMO demapping use case, the process may proceed with demapping the MIMO channel matrix based on combining the current partial changed basis and each of the additional partial changed basis generated by each of the one or more additional iterations of the neural lattice reduction model.

In certain aspects, the model 720 is parallelizable. That is, in certain aspects, the neural method described with respect to model 720 is suitable for reducing multiple lattices simultaneously on modern hardware by graphic processing unit batching. The parallelizability of the model 720 may provide a technical benefit over conventional lattice reduction heuristics. For example, each of the spatially separate signals received by each of the separate antennas of the plurality of antennas produces a separate lattice. In certain aspects, each of the lattices can be reduced in parallel by executing the model 720 in parallel. Furthermore, in certain aspects, the model 720 can fully leverage the deep learning hardware and can parallelize lattice reduction across multiple lattices (distributed across frequency and time).

Example Operations

Figure 9:
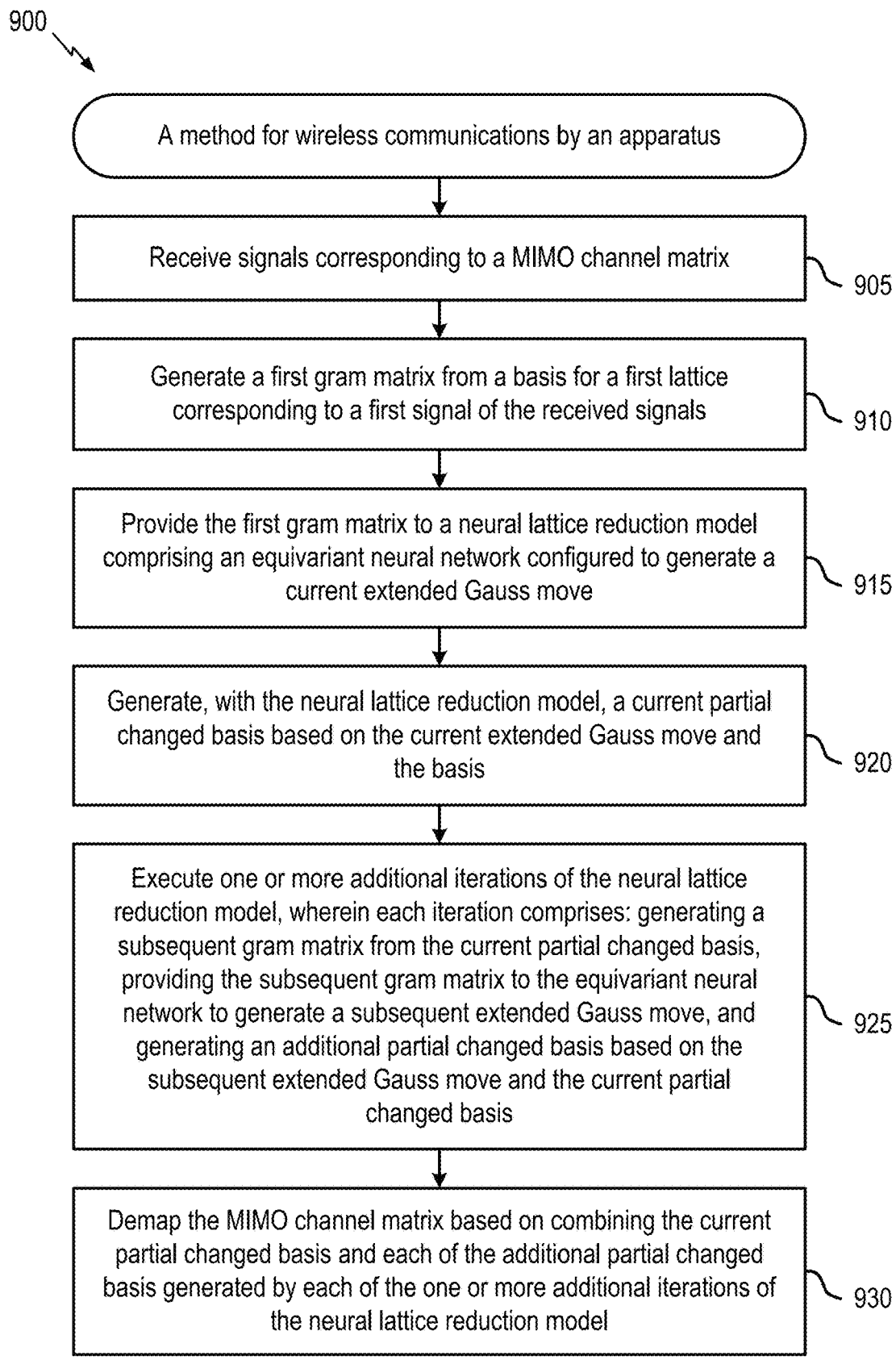
FIG. 9 depicts a method for neural lattice reduction and demapping of a MIMO channel matrix.

FIG. 9 shows a method 900 for wireless communications by an apparatus, such as UE 104 of FIGS. 1 and 3.

Method 900 begins at block 905 with receiving signals corresponding to a MIMO channel matrix.

Method 900 then proceeds to block 910 with generating a first gram matrix from a basis for a first lattice corresponding to a first signal of the received signals.

Method 900 then proceeds to block 915 with providing the first gram matrix to a neural lattice reduction model comprising an equivariant neural network configured to generate a current extended Gauss move.

Method 900 then proceeds to block 920 with generating, with the neural lattice reduction model, a current partial changed basis based on the current extended Gauss move and the basis.

Method 900 then proceeds to block 925 with executing one or more additional iterations of the neural lattice reduction model, wherein each iteration comprises: generating a subsequent gram matrix from the current partial changed basis, providing the subsequent gram matrix to the equivariant neural network to generate a subsequent extended Gauss move, and generating an additional partial changed basis based on the subsequent extended Gauss move and the current partial changed basis.

Method 900 then proceeds to block 930 with demapping the MIMO channel matrix based on combining the current partial changed basis and each of the additional partial changed basis generated by each of the one or more additional iterations of the neural lattice reduction model.

In certain aspects, combining the current partial changed basis and each of the additional partial changed basis form a first reduced basis for the first lattice.

In certain aspects, method 900 further includes generating a second gram matrix from a basis for a second lattice corresponding to a second signal of the received signals.

In certain aspects, method 900 further includes generating, with the neural lattice reduction model, one or more second partial changed bases for the second lattice.

In certain aspects, method 900 further includes generating a second reduced basis for the second lattice based on the one or more second partial changed bases, wherein the one or more processors generate the first reduced basis and the second reduced basis through parallel processing of the neural lattice reduction model.

In certain aspects, the apparatus comprises a plurality of antennas, wherein the first signal of the received signals is received by a first antenna of the plurality of antennas and the second signal of the received signals is received by a second antenna of the plurality of antennas.

In certain aspects, the parallel processing of the neural lattice reduction model is implemented by graphic processing unit batching.

In certain aspects, method 900 further includes demapping the MIMO channel matrix based on the first reduced basis and the second reduced basis.

In certain aspects, the first reduced basis is more orthogonal and shorter than the basis for the first lattice corresponding to the MIMO channel matrix.

In certain aspects, the apparatus comprises a plurality of antennas configured to receive the signals, wherein the received signals are distributed across time and frequency.

Figure 11:
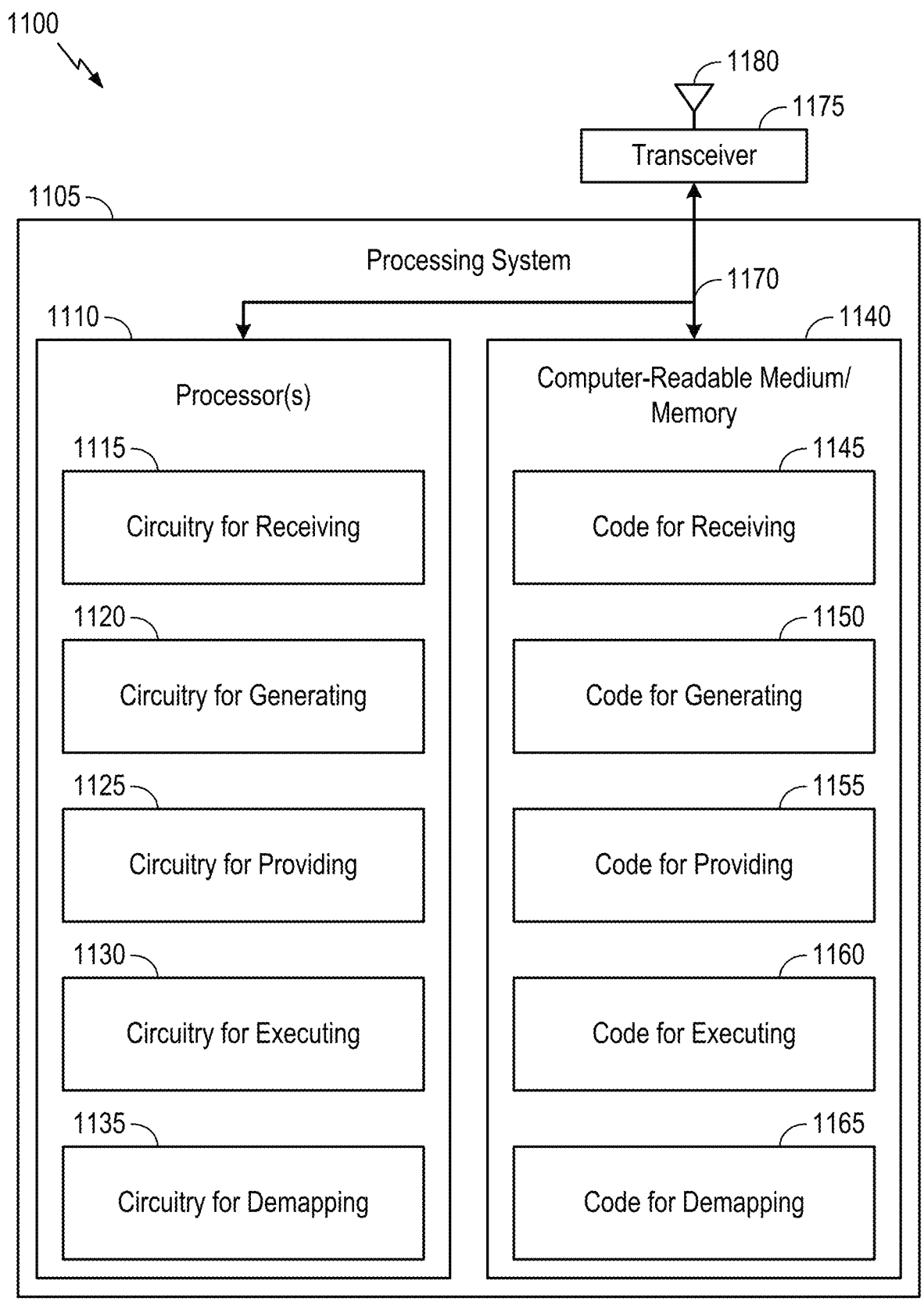
FIG. 11 depicts aspects of an example communications device.

In certain aspects, method 900, or any aspect related to it, may be performed by an apparatus, such as communications device 1100 of FIG. 11, which includes various components operable, configured, or adapted to perform the method 900. Communications device 1100 is described below in further detail.

Note that FIG. 9 is just one example of a method, and other methods including fewer, additional, or alternative operations are possible consistent with this disclosure.

Figure 10:
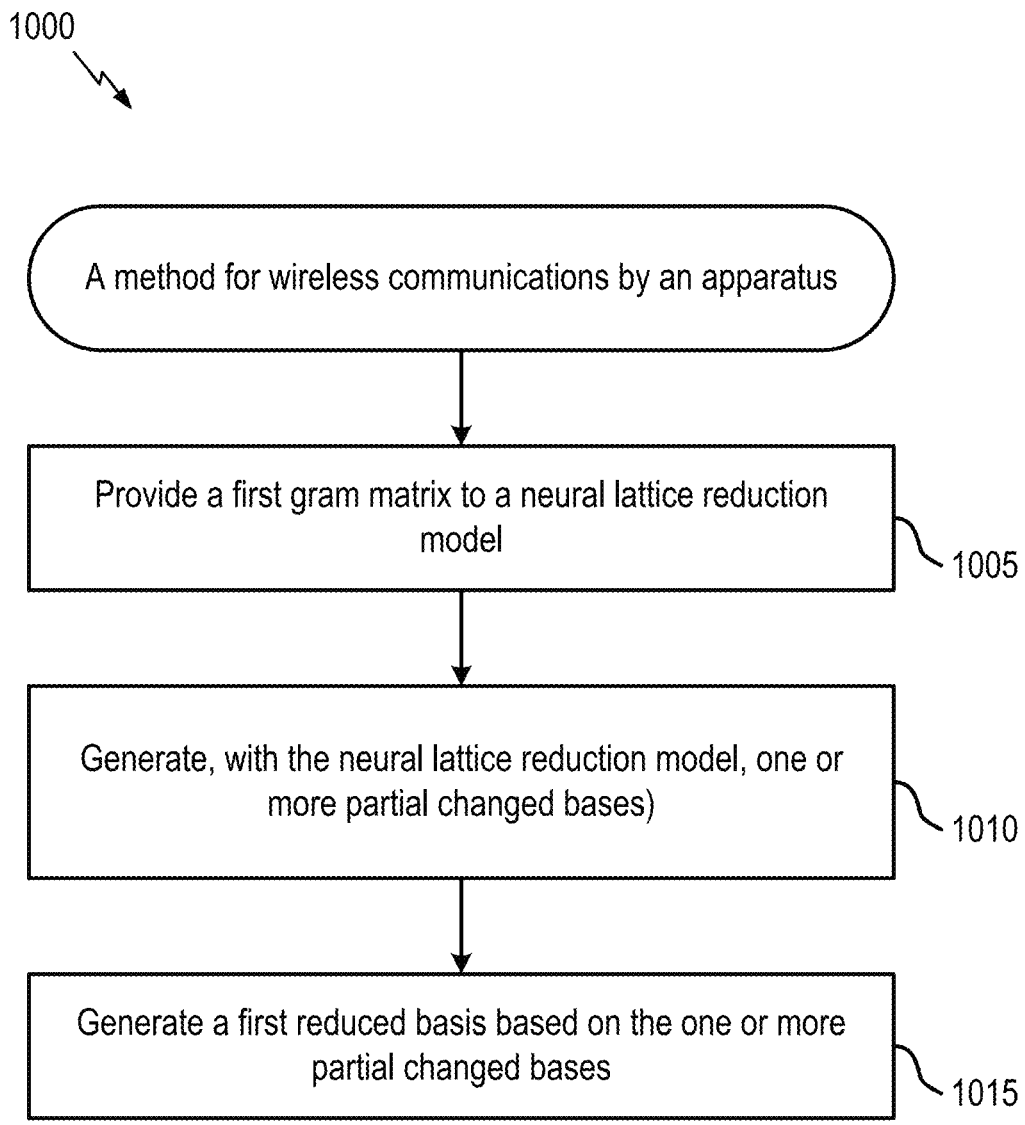
FIG. 10 depicts a method for neural lattice reduction.

FIG. 10 shows a method 1000 for wireless communications by an apparatus, such as UE 104 of FIGS. 1 and 3.

Method 1000 begins at block 1005 with providing a first gram matrix to a neural lattice reduction model.

Method 1000 then proceeds to block 1010 with generating, with the neural lattice reduction model, one or more partial changed bases.

Method 1000 then proceeds to block 1015 with generating a first reduced basis based on the one or more partial changed bases.

In certain aspects, the neural lattice reduction model comprises an equivariant neural network configured to generate a current extended Gauss move.

In certain aspects, method 1000 further includes generating the first gram matrix from a basis for a first lattice corresponding to a first signal of a plurality of received signals, wherein the one or more partial changed bases generated by the neural lattice reduction model is based on at least the current extended Gauss move and the basis.

In certain aspects, method 1000 further includes executing a plurality of additional iterations of the neural lattice reduction model, wherein each iteration comprises: generating a subsequent gram matrix from one of the one or more partial changed bases, providing the subsequent gram matrix to the neural lattice reduction model to generate a subsequent extended Gauss move, and generate an additional partial changed basis based on the subsequent extended Gauss move and the one or more partial changed bases.

In certain aspects, method 1000 further includes providing a second gram matrix from a basis for a second lattice.

In certain aspects, method 1000 further includes generating, with the neural lattice reduction model, one or more second partial changed bases for the second lattice.

In certain aspects, method 1000 further includes generating a second reduced basis for the second lattice based on the one or more second partial changed bases, wherein the one or more processors generate the first reduced basis and the second reduced basis through parallel processing of the neural lattice reduction model.

In certain aspects, the parallel processing of the neural lattice reduction model is implemented by graphic processing unit batching.

In certain aspects, method 1000 further includes generating the first gram matrix from a basis for a first lattice corresponding to a first signal of a plurality of received signals.

In certain aspects, the plurality of received signals correspond to a MIMO channel matrix.

In certain aspects, the apparatus comprises a plurality of antennas, wherein the first signal of the plurality of received signals is received by a first antenna of the plurality of antennas and a second signal of the plurality of received signals is received by a second antenna of the plurality of antennas.

In certain aspects, method 1000 further includes combining the one or more partial changed bases to form the first reduced basis for a first lattice.

Figure 12:
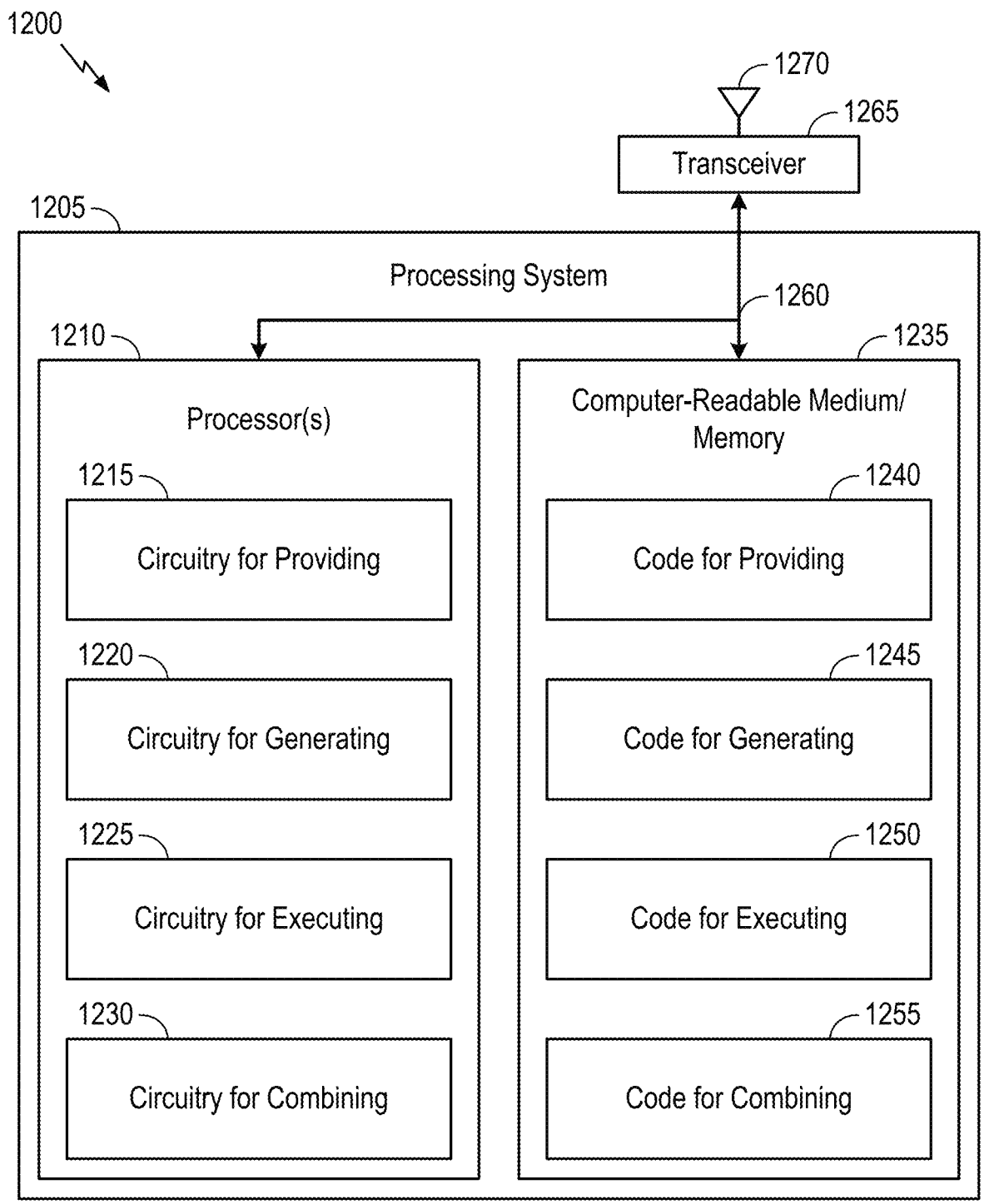
FIG. 12 depicts aspects of an example communications device.

In certain aspects, method 1000, or any aspect related to it, may be performed by an apparatus, such as communications device 1200 of FIG. 12, which includes various components operable, configured, or adapted to perform the method 1000. Communications device 1200 is described below in further detail.

Note that FIG. 10 is just one example of a method, and other methods including fewer, additional, or alternative operations are possible consistent with this disclosure.

Example Communications Devices

FIG. 11 depicts aspects of an example communications device 1100. In some aspects, communications device 1100 is a wireless communications device, such as a UE 104, a base station (BS 102/180) and/or a component of a disaggregated base station of FIGS. 1-3.

The communications device 1100 includes a processing system 1105 coupled to a transceiver 1175 (e.g., a transmitter and/or a receiver). The transceiver 1175 is configured to transmit and receive signals for the communications device 1100 via an antenna 1180, such as the various signals as described herein. The processing system 1105 may be configured to perform processing functions for the communications device 1100, including processing signals received and/or to be transmitted by the communications device 1100.

The processing system 1105 includes one or more processors 1110. In various aspects, the one or more processors 1110 may be representative of one or more of receive processor 358, transmit processor 364, TX MIMO processor 366, and/or controller/processor 380, as described with respect to FIG. 3. The one or more processors 1110 are coupled to a computer-readable medium/memory 1140 via a bus 1170. In certain aspects, the computer-readable medium/memory 1140 is configured to store instructions (e.g., computer-executable code) that when executed by the one or more processors 1110, enable and cause the one or more processors 1110 to perform the method 900 described with respect to FIG. 9, or any aspect related to it, including any operations described in relation to FIG. 9. Note that reference to a processor performing a function of communications device 1100 may include one or more processors performing that function of communications device 1100, such as in a distributed fashion.

In the depicted example, computer-readable medium/memory 1140 stores code for receiving 1145, code for generating 1150, code for providing 1155, code for executing 1160, and code for demapping 1165. Processing of the code 1145-1165 may enable and cause the communications device 1100 to perform the method 900 described with respect to FIG. 9, or any aspect related to it.

The one or more processors 1110 include circuitry configured to implement (e.g., execute) the code stored in the computer-readable medium/memory 1140, including circuitry for receiving 1115, circuitry for generating 1120, circuitry for providing 1125, circuitry for executing 1130, and circuitry for demapping 1135. Processing with circuitry 1115-1135 may enable and cause the communications device 1100 to perform the method 900 described with respect to FIG. 9, or any aspect related to it.

More generally, means for communicating, transmitting, sending or outputting for transmission may include the transceivers 354, antenna(s) 352, transmit processor 364, TX MIMO processor 366, AI processor 370, and/or controller/processor 380 of the UE 104 illustrated in FIG. 3, transceiver 1175 and/or antenna 1180 of the communications device 1100 in FIG. 11, and/or one or more processors 1110 of the communications device 1100 in FIG. 11. Means for communicating, receiving or obtaining may include the transceivers 354, antenna(s) 352, receive processor 358, AI processor 370, and/or controller/processor 380 of the UE 104 illustrated in FIG. 3, transceiver 1175 and/or antenna 1180 of the communications device 1100 in FIG. 11, and/or one or more processors 1110 of the communications device 1100 in FIG. 11.

FIG. 12 depicts aspects of an example communications device 1200. In some aspects, communications device 1200 is a wireless communications device, such as a UE 104, a base station (BS 102/180) and/or a component of a disaggregated base station of FIGS. 1-3.

The communications device 1200 includes a processing system 1205 coupled to a transceiver 1265 (e.g., a transmitter and/or a receiver). The transceiver 1265 is configured to transmit and receive signals for the communications device 1200 via an antenna 1270, such as the various signals as described herein. The processing system 1205 may be configured to perform processing functions for the communications device 1200, including processing signals received and/or to be transmitted by the communications device 1200.

The processing system 1205 includes one or more processors 1210. In various aspects, the one or more processors 1210 may be representative of one or more of receive processor 358, transmit processor 364, TX MIMO processor 366, and/or controller/processor 380, as described with respect to FIG. 3. The one or more processors 1210 are coupled to a computer-readable medium/memory 1235 via a bus 1260. In certain aspects, the computer-readable medium/memory 1235 is configured to store instructions (e.g., computer-executable code) that when executed by the one or more processors 1210, enable and cause the one or more processors 1210 to perform the method 1000 described with respect to FIG. 10, or any aspect related to it, including any operations described in relation to FIG. 10. Note that reference to a processor performing a function of communications device 1200 may include one or more processors performing that function of communications device 1200, such as in a distributed fashion.

In the depicted example, computer-readable medium/memory 1235 stores code for providing 1240, code for generating 1245, code for executing 1250, and code for combining 1255. Processing of the code 1240-1255 may enable and cause the communications device 1200 to perform the method 1000 described with respect to FIG. 10, or any aspect related to it.

The one or more processors 1210 include circuitry configured to implement (e.g., execute) the code stored in the computer-readable medium/memory 1235, including circuitry for providing 1215, circuitry for generating 1220, circuitry for executing 1225, and circuitry for combining 1230. Processing with circuitry 1215-1230 may enable and cause the communications device 1200 to perform the method 1000 described with respect to FIG. 10, or any aspect related to it.

More generally, means for communicating, transmitting, sending or outputting for transmission may include the transceivers 354, antenna(s) 352, transmit processor 364, TX MIMO processor 366, AI processor 370, and/or controller/processor 380 of the UE 104 illustrated in FIG. 3, transceiver 1265 and/or antenna 1270 of the communications device 1200 in FIG. 12, and/or one or more processors 1210 of the communications device 1200 in FIG. 12. Means for communicating, receiving or obtaining may include the transceivers 354, antenna(s) 352, receive processor 358, AI processor 370, and/or controller/processor 380 of the UE 104 illustrated in FIG. 3, transceiver 1265 and/or antenna 1270 of the communications device 1200 in FIG. 12, and/or one or more processors 1210 of the communications device 1200 in FIG. 12.

Example Clauses

Implementation examples are described in the following numbered clauses:

Clause 1: A method for wireless communications by an apparatus comprising: receiving signals corresponding to a MIMO channel matrix; generating a first gram matrix from a basis for a first lattice corresponding to a first signal of the received signals; providing the first gram matrix to a neural lattice reduction model comprising an equivariant neural network configured to generate a current extended Gauss move; generating, with the neural lattice reduction model, a current partial changed basis based on the current extended Gauss move and the basis; executing one or more additional iterations of the neural lattice reduction model, wherein each iteration comprises: generating a subsequent gram matrix from the current partial changed basis, providing the subsequent gram matrix to the equivariant neural network to generate a subsequent extended Gauss move, and generating an additional partial changed basis based on the subsequent extended Gauss move and the current partial changed basis; and demapping the MIMO channel matrix based on combining the current partial changed basis and each of the additional partial changed basis generated by each of the one or more additional iterations of the neural lattice reduction model.

Clause 2: The method of Clause 1, wherein combining the current partial changed basis and each of the additional partial changed basis form a first reduced basis for the first lattice.

Clause 3: The method of Clause 2, further comprising: generating a second gram matrix from a second basis for a second lattice corresponding to a second signal of the received signals; generating, with the neural lattice reduction model, one or more second partial changed bases for the second lattice; and generating a second reduced basis for the second lattice based on the one or more second partial changed bases, the first reduced basis and the second reduced basis are generated through parallel processing of the neural lattice reduction model.

Clause 4: The method of Clause 3, wherein the apparatus comprises a plurality of antennas, wherein the first signal of the received signals is received by a first antenna of the plurality of antennas and the second signal of the received signals is received by a second antenna of the plurality of antennas.

Clause 5: The method of Clause 3, wherein the parallel processing of the neural lattice reduction model is implemented by graphic processing unit batching.

Clause 6: The method of Clause 3, further comprising demapping the MIMO channel matrix based on the first reduced basis and the second reduced basis.

Clause 7: The method of Clause 2, wherein the first reduced basis is more orthogonal and shorter than the basis for the first lattice corresponding to the MIMO channel matrix.

Clause 8: The method of any one of Clauses 1-7, wherein the received signals are distributed across time and frequency.

Clause 9: A method for wireless communications by an apparatus comprising: providing a first gram matrix to a neural lattice reduction model; generating, with the neural lattice reduction model, one or more partial changed bases; and generating a first reduced basis based on the one or more partial changed bases.

Clause 10: The method of Clause 9, wherein the neural lattice reduction model comprises an equivariant neural network configured to generate a current extended Gauss move.

Clause 11: The method of Clause 10, further comprising generating the first gram matrix from a basis for a first lattice corresponding to a first signal of a plurality of received signals, wherein the one or more partial changed bases generated by the neural lattice reduction model is based on at least the current extended Gauss move and the basis.

Clause 12: The method of any one of Clauses 9-11, further comprising executing a plurality of additional iterations of the neural lattice reduction model, wherein each iteration comprises: generating a subsequent gram matrix from one of the one or more partial changed bases, providing the subsequent gram matrix to the neural lattice reduction model to generate a subsequent extended Gauss move, and generate an additional partial changed basis based on the subsequent extended Gauss move and the one or more partial changed bases.

Clause 13: The method of any one of Clauses 9-12, further comprising: providing a second gram matrix from a basis for a second lattice; generating, with the neural lattice reduction model, one or more second partial changed bases for the second lattice; and generating a second reduced basis for the second lattice based on the one or more second partial changed bases, wherein the one or more processors generate the first reduced basis and the second reduced basis through parallel processing of the neural lattice reduction model.

Clause 14: The method of Clause 13, wherein the parallel processing of the neural lattice reduction model is implemented by graphic processing unit batching.

Clause 15: The method of any one of Clauses 9-14, further comprising: generating the first gram matrix from a basis for a first lattice corresponding to a first signal of a plurality of received signals.

Clause 16: The method of Clause 15, wherein the plurality of received signals correspond to a MIMO channel matrix.

Clause 17: The method of Clause 16, wherein the first signal of the plurality of received signals is received by a first antenna of a plurality of antennas and a second signal of the plurality of received signals is received by a second antenna of the plurality of antennas.

Clause 18: The method of any one of Clauses 9-17, further comprising: combining the one or more partial changed bases to form the first reduced basis for a first lattice.

Clause 19: One or more apparatuses, comprising: one or more memories comprising executable instructions; and one or more processors configured to execute the executable instructions and cause the one or more apparatuses to perform a method in accordance with any one of Clauses 1-18.

Clause 20: One or more apparatuses, comprising: one or more memories; and one or more processors, coupled to the one or more memories, configured to cause the one or more apparatuses to perform a method in accordance with any one of Clauses 1-18.

Clause 21: One or more apparatuses, comprising: one or more memories; and one or more processors, coupled to the one or more memories, configured to perform a method in accordance with any one of Clauses 1-18.

Clause 22: One or more apparatuses, comprising means for performing a method in accordance with any one of Clauses 1-18.

Clause 23: One or more non-transitory computer-readable media comprising executable instructions that, when executed by one or more processors of one or more apparatuses, cause the one or more apparatuses to perform a method in accordance with any one of Clauses 1-18.

Clause 24: One or more computer program products embodied on one or more computer-readable storage media comprising code for performing a method in accordance with any one of Clauses 1-18.

Clause 25: A user equipment (UE), comprising: a processing system that includes processor circuitry and memory circuitry that stores code and is coupled with the processor circuitry, the processing system configured to cause the UE to perform a method in accordance with any one of Clauses 1-18.

Clause 26: A network entity, comprising: a processing system that includes processor circuitry and memory circuitry that stores code and is coupled with the processor circuitry, the processing system configured to cause the network entity to perform a method in accordance with any one of Clauses 1-18.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled to" and "coupled with" generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Reference to an element in the singular is not intended to mean only one unless specifically so stated, but rather "one or more." For example, reference to an element (e.g., "a processor," "a controller," "a memory," etc.), unless otherwise specifically stated, should be understood to refer to one or more elements (e.g., "one or more processors," "one or more controllers," "one or more memories," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

What is claimed is:

1. An apparatus configured for wireless communication, comprising:
    one or more memories; and
    one or more processors, coupled to the one or more memories, configured to cause the apparatus to:
        receive signals corresponding to a multiple-input multiple-output (MIMO) channel matrix;
        generate a first gram matrix from a basis for a first lattice corresponding to a first signal of the received signals;
        provide the first gram matrix to a neural lattice reduction model comprising an equivariant neural network configured to generate a current extended Gauss move;
        generate, with the neural lattice reduction model, a current partial changed basis based on the current extended Gauss move and the basis;
        execute one or more additional iterations of the neural lattice reduction model, wherein each iteration comprises:
            generating a subsequent gram matrix from the current partial changed basis,
            providing the subsequent gram matrix to the equivariant neural network to generate a subsequent extended Gauss move, and
            generating an additional partial changed basis based on the subsequent extended Gauss move and the current partial changed basis; and
        demap the MIMO channel matrix based on combining the current partial changed basis and each of the additional partial changed basis generated by each of the one or more additional iterations of the neural lattice reduction model.

2. The apparatus of claim 1, wherein combining the current partial changed basis and each of the additional partial changed basis form a first reduced basis for the first lattice.

3. The apparatus of claim 2, wherein the one or more processors are configured to further cause the apparatus to:
    generate a second gram matrix from a second basis for a second lattice corresponding to a second signal of the received signals;
    generate, with the neural lattice reduction model, one or more second partial changed bases for the second lattice; and
    generate a second reduced basis for the second lattice based on the one or more second partial changed bases, wherein the one or more processors generate the first reduced basis and the second reduced basis through parallel processing of the neural lattice reduction model.

4. The apparatus of claim 3, further comprising a plurality of antennas, wherein the first signal of the received signals is received by a first antenna of the plurality of antennas and the second signal of the received signals is received by a second antenna of the plurality of antennas.

5. The apparatus of claim 3, wherein the parallel processing of the neural lattice reduction model is implemented by graphic processing unit batching.

6. The apparatus of claim 3, wherein the one or more processors are configured to further cause the apparatus to demap the MIMO channel matrix based on the first reduced basis and the second reduced basis.

7. The apparatus of claim 2, wherein the first reduced basis is more orthogonal and shorter than the basis for the first lattice corresponding to the MIMO channel matrix.

8. The apparatus of claim 1, further comprising a plurality of antennas configured to receive the signals, wherein the received signals are distributed across time and frequency.

9. A method for wireless communications by an apparatus comprising:
    receiving signals corresponding to a multiple-input multiple-output (MIMO) channel matrix;
    generating a first gram matrix from a basis for a first lattice corresponding to a first signal of the received signals;
    providing the first gram matrix to a neural lattice reduction model comprising an equivariant neural network configured to generate a current extended Gauss move;
    generating, with the neural lattice reduction model, a current partial changed basis based on the current extended Gauss move and the basis;
    executing one or more additional iterations of the neural lattice reduction model, wherein each iteration comprises: generating a subsequent gram matrix from the current partial changed basis, providing the subsequent gram matrix to the equivariant neural network to generate a subsequent extended Gauss move, and generating an additional partial changed basis based on the subsequent extended Gauss move and the current partial changed basis; and
    demapping the MIMO channel matrix based on combining the current partial changed basis and each of the additional partial changed basis generated by each of the one or more additional iterations of the neural lattice reduction model.

10. The method of claim 9, wherein combining the current partial changed basis and each of the additional partial changed basis form a first reduced basis for the first lattice.

11. The method of claim 10, further comprising:
generating a second gram matrix from a second basis for a second lattice corresponding to a second signal of the received signals;
generating, with the neural lattice reduction model, one or more second partial changed bases for the second lattice; and
generating a second reduced basis for the second lattice based on the one or more second partial changed bases, wherein the first reduced basis and the second reduced basis are generated through parallel processing of the neural lattice reduction model.

12. The method of claim 11, wherein the first signal of the received signals is received by a first antenna of a plurality of antennas and the second signal of the received signals is received by a second antenna of the plurality of antennas.

13. The method of claim 11, wherein the parallel processing of the neural lattice reduction model is implemented by graphic processing unit batching.

14. The method of claim 11, further comprising demapping the MIMO channel matrix based on the first reduced basis and the second reduced basis.

15. The method of claim 10, wherein the first reduced basis is more orthogonal and shorter than the basis for the first lattice corresponding to the MIMO channel matrix.

16. The method of claim 9, wherein the received signals are distributed across time and frequency.

17. A non-transitory computer-readable medium comprising processor-executable instructions that, when executed by one or more processors of an apparatus, causes the apparatus to perform a method comprising:
receiving signals corresponding to a multiple-input multiple-output (MIMO) channel matrix;
generating a first gram matrix from a basis for a first lattice corresponding to a first signal of the received signals;
providing the first gram matrix to a neural lattice reduction model comprising an equivariant neural network configured to generate a current extended Gauss move;
generating, with the neural lattice reduction model, a current partial changed basis based on the current extended Gauss move and the basis;
executing one or more additional iterations of the neural lattice reduction model, wherein each iteration comprises: generating a subsequent gram matrix from the current partial changed basis, providing the subsequent gram matrix to the equivariant neural network to generate a subsequent extended Gauss move, and generating an additional partial changed basis based on the subsequent extended Gauss move and the current partial changed basis; and
demapping the MIMO channel matrix based on combining the current partial changed basis and each of the additional partial changed basis generated by each of the one or more additional iterations of the neural lattice reduction model.

18. The non-transitory computer-readable medium of claim 17, wherein combining the current partial changed basis and each of the additional partial changed basis form a first reduced basis for the first lattice.

19. The non-transitory computer-readable medium of claim 18, wherein the method further comprises:
generating a second gram matrix from a second basis for a second lattice corresponding to a second signal of the received signals;
generating, with the neural lattice reduction model, one or more second partial changed bases for the second lattice; and
generating a second reduced basis for the second lattice based on the one or more second partial changed bases, wherein the first reduced basis and the second reduced basis are generated through parallel processing of the neural lattice reduction model.

20. The non-transitory computer-readable medium of claim 19, wherein the first signal of the received signals is received by a first antenna of a plurality of antennas and the second signal of the received signals is received by a second antenna of the plurality of antennas.

* * * * *